US012640297B2

(12) United States Patent
Hsieh

(10) Patent No.: US 12,640,297 B2
(45) Date of Patent: May 26, 2026

(54) MAGNETIC POSITIONING HOLDER

(71) Applicant: Chih-Chien Hsieh, Taichung City (TW)

(72) Inventor: Chih-Chien Hsieh, Taichung City (TW)

( * ) Notice: Subject to any disclaimer, the term of this patent is extended or adjusted under 35 U.S.C. 154(b) by 85 days.

(21) Appl. No.: 18/585,025

(22) Filed: Feb. 22, 2024

(65) Prior Publication Data

US 2025/0273370 A1 Aug. 28, 2025

(51) Int. Cl.
*H01F 7/02* (2006.01)

(52) U.S. Cl.
CPC .................................. *H01F 7/0252* (2013.01)

(58) Field of Classification Search
CPC ..................................................... H01F 7/0252
See application file for complete search history.

(56) References Cited

U.S. PATENT DOCUMENTS 2,580,099 A * 12/1951 Jaeger ...................... B25H 3/04 211/DIG. 1
4,345,704 A * 8/1982 Boughton ................ B62J 11/04 224/431
4,976,385 A 12/1990 Matsumoto
5,497,902 A * 3/1996 Crock ................ A47G 23/0216 220/737
9,920,877 B2 * 3/2018 Conti ................... F16M 13/027
10,954,035 B2 * 3/2021 Fromme ................ B65D 41/04

* cited by examiner

*Primary Examiner* — Bernard Rojas

(57) ABSTRACT

The present invention discloses a magnetic positioning holder for positioning a cylindrical storage container, comprising a main body and two magnetic strips. The main body features two guide surfaces on one side in the thickness direction, each adjacent to one of the sides of the main body, wherein each guide surface is concave toward the other side of the main body in the thickness direction to from an arc. Each magnetic strip is embedded in the main body and corresponds to each guide surface along the thickness direction of the main body. The distance between each magnetic strip and its corresponding guide surface, defined as the magnetic attraction distance, decreases from each width side toward the central part of the main body along the width direction. Thus, the storage container can be guided to move toward the central part of the main body in the width direction and positioned.

4 Claims, 10 Drawing Sheets

MAGNETIC POSITIONING HOLDER

FIELD OF INVENTION

The present invention relates to a tool for positioning storage containers, in particular to a magnetic positioning holder.

BACKGROUND OF THE INVENTION

The assembly or maintenance of equipment often requires different types or specifications of tools. Throughout the assembly or maintenance process, the tools, components to be installed onto the equipment, or the components to be removed from the equipment can be selectively stored in a storage container. This container is strategically placed within easy reach of the operator to enhance the convenience of the assembly or maintenance operation.

When at least a part of the storage container is made of a metal material that can be magnetically attracted, a magnetic holder is commonly used to position the storage container. As shown in FIG. 1, the magnetic holder comprises a main body 11 having a long plate-like structure and multiple magnets 12. The main body 11 forms a surface 13 on one side in the thickness direction, and the magnets 12 are spaced along the length direction inside the main body 11. Each magnet 12 is positioned relative to the center of the plane 13 in the width direction.

A facade (not shown) could be provided on the side relative to another side of the surface 13 of the main body 11 in the thickness direction made of a metal material that can be magnetically attracted. This facade could be, for example, a side panel of a tool cabinet. By leveraging the magnetic force of each magnet 12 to position the main body 11 vertically, the storage container can then be positioned laterally against the surface 13, with each magnet 12 attracting the container to ensure its placement and securement.

The external configuration of the storage container is not specifically limited; it may be a rectangular cylinder, a cylindrical shape, or any other shape. However, for non-planar cylindrical or other shaped containers, when the container is placed against the surface 13, the container makes linear contact with the surface 13. When the storage container is then placed on the main body 11, the operator may inadvertently misalign it by failing to accurately position the container in the central part where each magnet 12 is located in the width direction of the surface 13. This oversight or other factors may compromise the stability of the storage container positioning.

SUMMARY OF THE INVENTION

The main purpose of the present invention is to provide a magnetic positioning holder.

To achieve this purpose, the present invention adopts the following technical solution:

The magnetic positioning holder used for magnetically positioning a cylindrical storage container, at least a part of which is made of a metal material that can be magnetically attracted.

The magnetic positioning holder comprises:

A main body having a long plate-like structure. The main body features an upper edge side and a lower edge side at each end of its longitudinal direction, width sides formed on both sides in the width direction, and two guide surfaces formed on one side in the thickness direction. Each guide surface is adjacent to each width side and is concave toward the other side of the main body in the thickness direction to form an arc. The arcuate extension direction of each guide surface is directed toward the adjacent width side.

Two magnetic strips, each being a longitudinally magnetized rectangular strip. Each magnetic strip is embedded in the main body for magnetically attracting the storage container. The magnetic strips are parallel to each other, and the longitudinal direction of each is directed toward the upper edge side and the lower edge side. Each magnetic strip is adjacent to each width side, and each magnetic strip corresponds to each guide surface along the thickness direction of the main body.

The distance between each magnetic strip and its corresponding guide surface along the thickness direction of the main body is defined as the magnetic attraction distance. Along the width direction of the main body, the magnetic attraction distance decreases from each width side toward the central part of the main body. Thus, the storage container can be guided to move toward the central part of the main body in the width direction and positioned.

The main effect and advantage of the present invention are to guide and position the storage container toward the central portion of the main body in the width direction, facilitating the collective magnetic adsorption positioning of the magnetic strips, thereby increasing the stability of the storage container positioning.

DETAILED DESCRIPTION OF THE PREFERRED EMBODIMENTS

Figure 1:
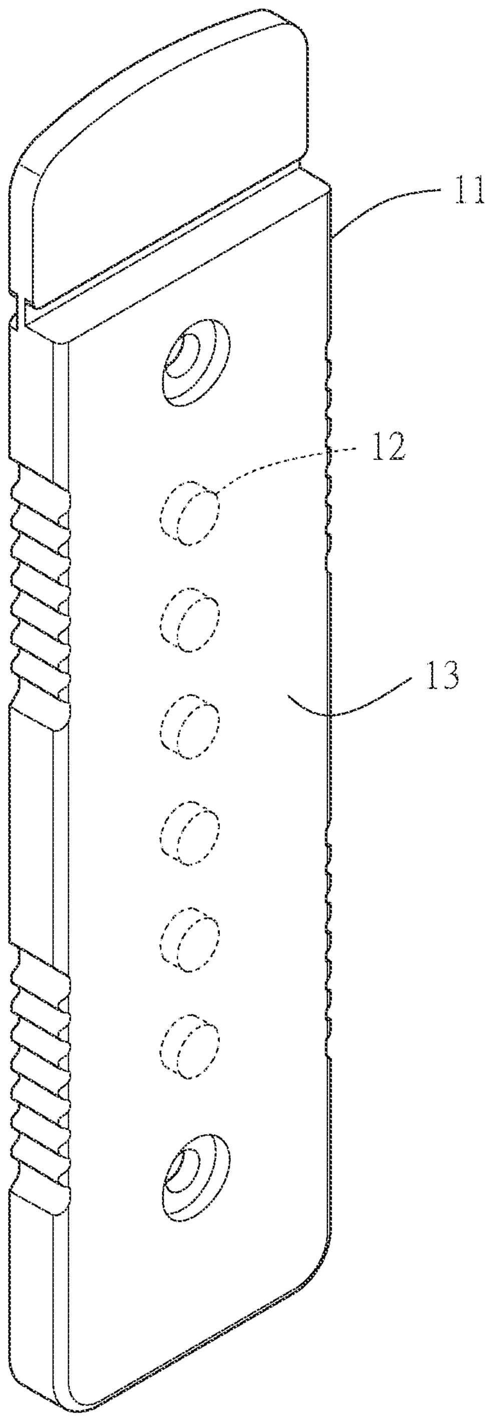
FIG. 1 PRIOR ART
FIG. 1 is a three-dimensional view of a magnetic holder of the prior art.
Figure 2:
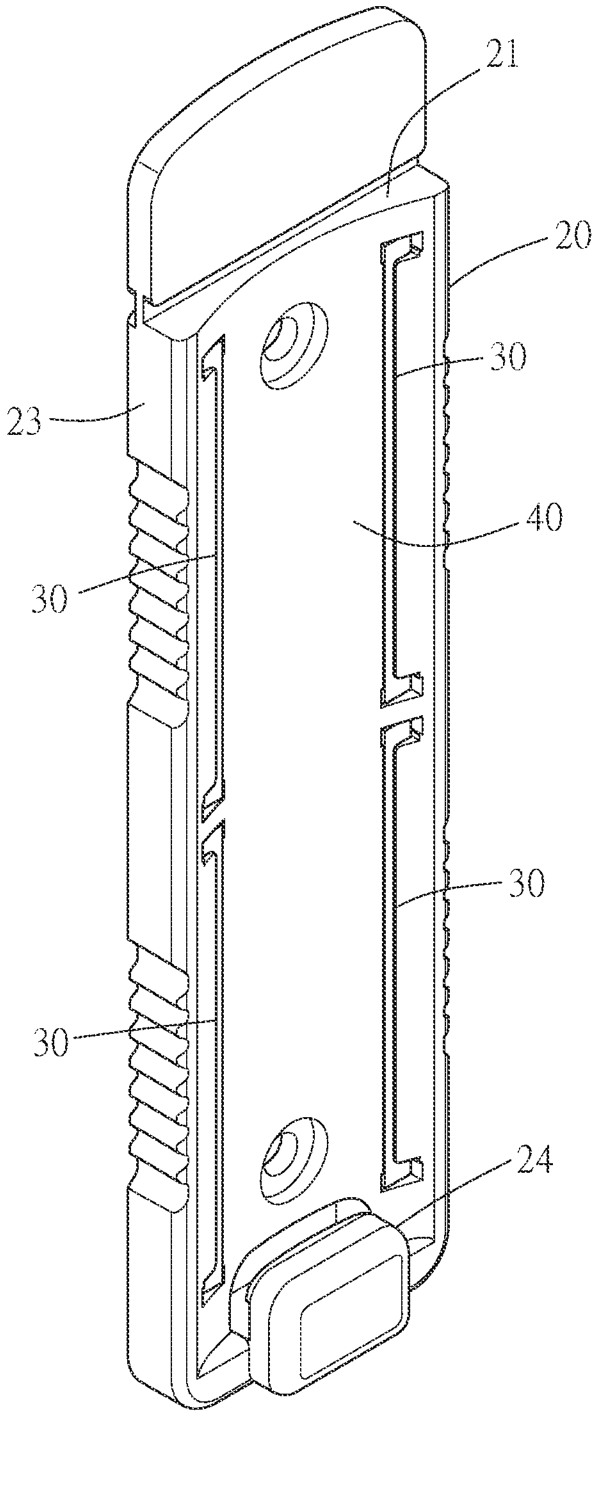
FIG. 2 is a three-dimensional view of a preferred embodiment of the present invention.
Figure 3:
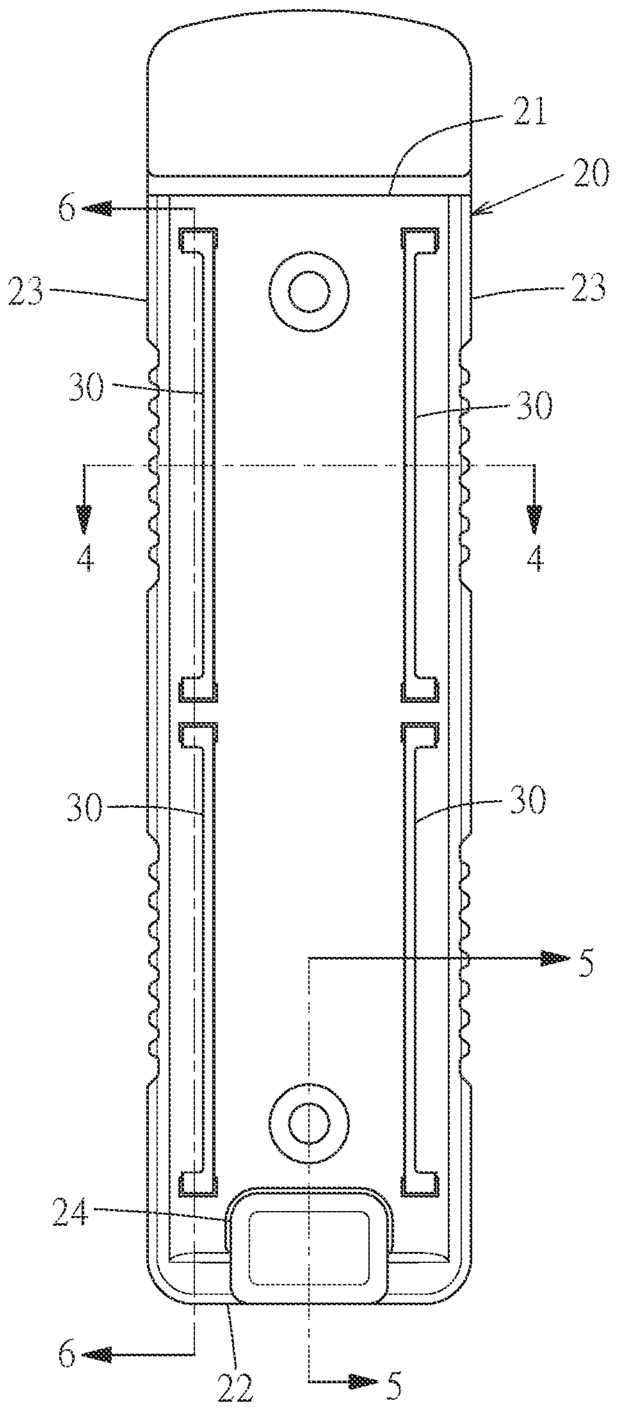
FIG. 3 is a front elevational view of a preferred embodiment of the present invention.
Figure 4:
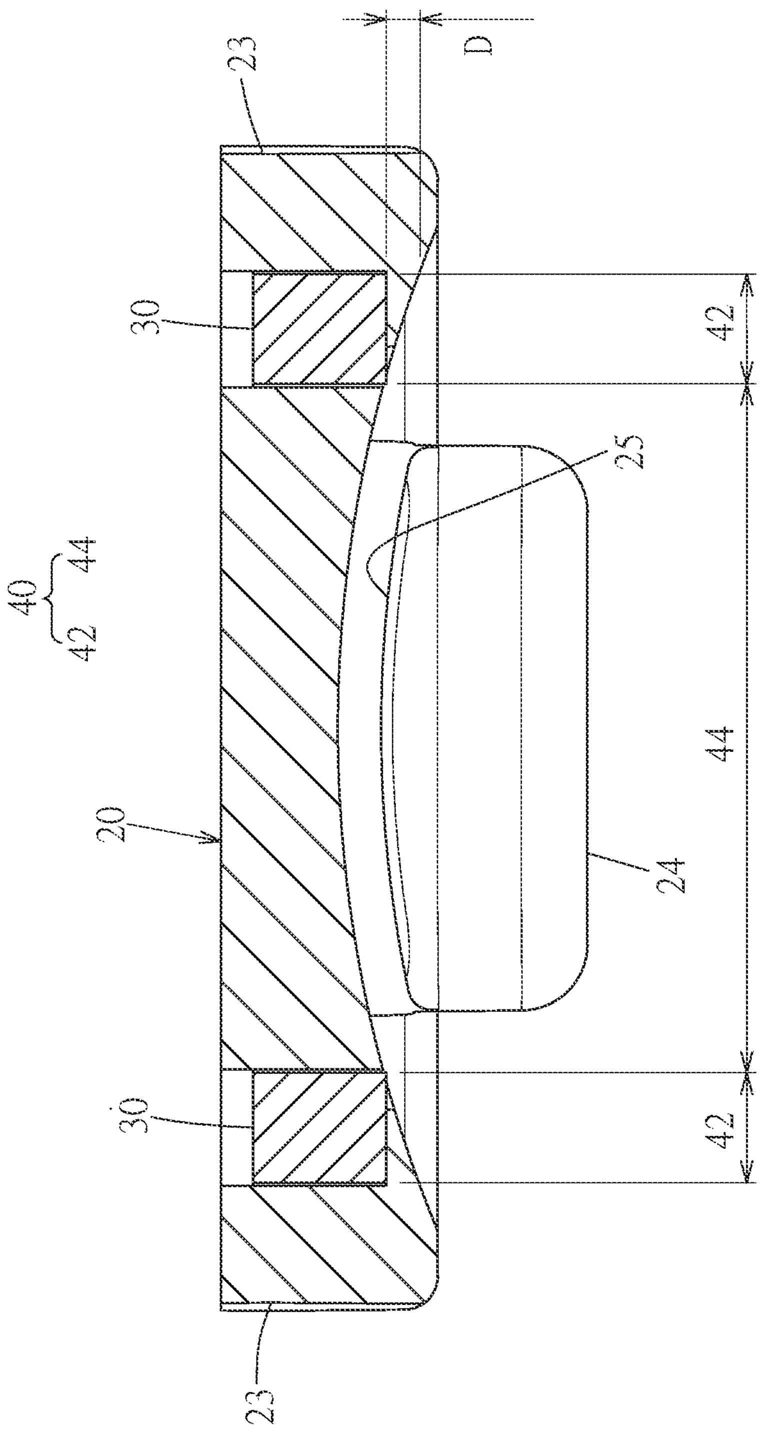
FIG. 4 is a cross-sectional view taken along line 4-4 of FIG. 3.
Figure 5:
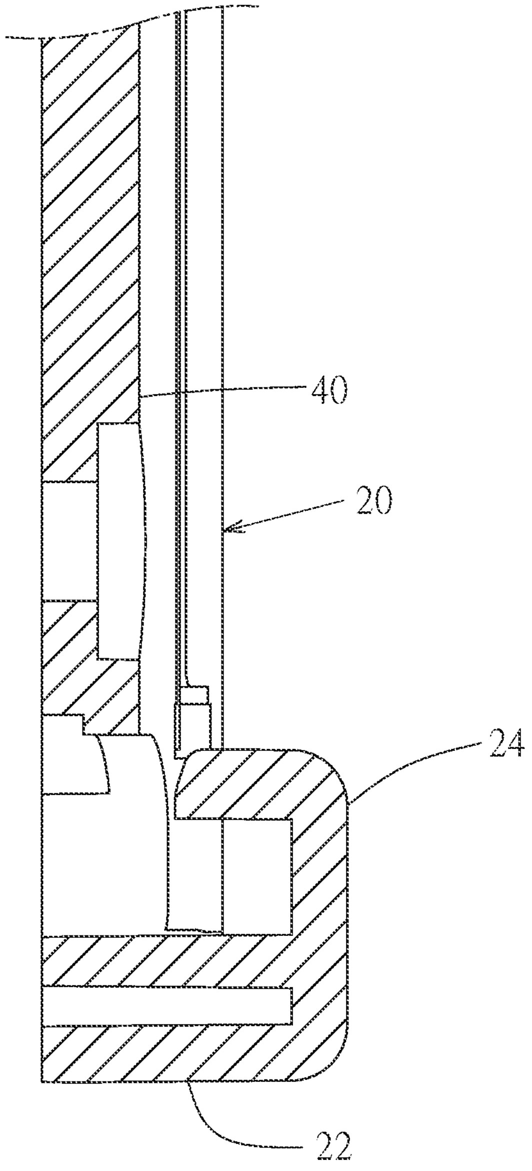
FIG. 5 is a cross-sectional view taken along line 5-5 of FIG. 3.
Figure 6:
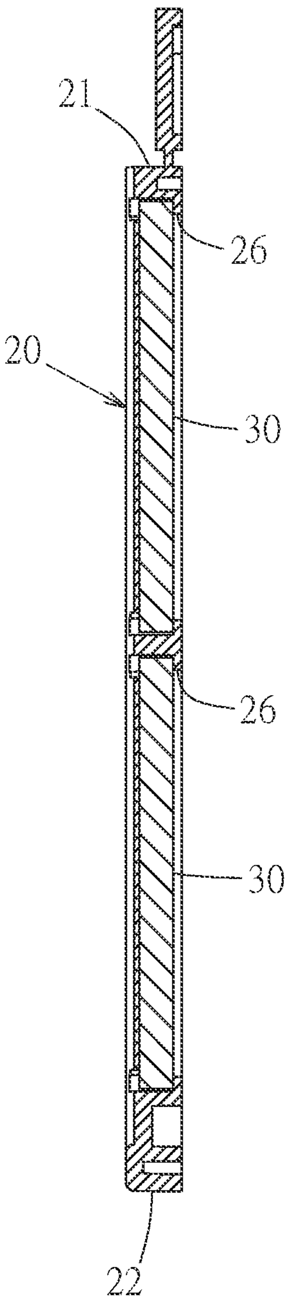
FIG. 6 is a cross-sectional view taken along line 6-6 of FIG. 3.

The drawings herein depict a preferred embodiment of a magnetic positioning holder of the present invention. However, the following embodiments are for illustrative purposes only and do not limit the scope of the structure in the patent application.

As shown in FIGS. 2 to 10, the preferred embodiment of the magnetic positioning holder is used to magnetically position a cylindrical storage container 90, at least a part of which is made of a metal material that can be magnetically attracted.

The preferred embodiment of the magnetic positioning holder comprises a main body 20 having a long plate-like structure and four magnetic strips 30. The main body 20 features an upper edge side 21 and a lower edge side 22 at each end of its longitudinal direction, width sides 23 formed on both sides in the width direction, and two guide surfaces 42 formed on one side in the thickness direction. Each guide surface 42 is adjacent to each width side 23 and is concave toward the other side of the main body 20 in the thickness direction to form an arc. The arcuate extension direction of each guide surface 42 is directed toward the adjacent width side 23. One end of each guide surface 42 selectively extends toward the upper edge side 21, and the other end extends toward the lower edge side 22. In this embodiment, the end of each guide surface 42 is away from the upper edge side 21 and selectively closer to the lower edge side 22, but does not reach to the lower edge side 22.

Each magnetic strip 30 is a longitudinally magnetized rectangular strip. Each magnetic strip 30 is selectively embedded in the main body 20 from the rear side for magnetically attracting the storage container 90. The magnetic strips 30 are parallel to each other, and the longitudinal direction of each is directed toward the upper edge side 21 and the lower edge side 22. Each magnetic strip 30 is adjacent to each width side 23, and each magnetic strip 30 corresponds to each guide surface 42 along the thickness direction of the main body 20.

The magnetic strips 30 are arranged in pairs in a side-by-side configuration, and their number may vary based on the length of the main body 20, but is guided by the principle of having an even number of magnetic strips 30, with a minimum of two. The main body 20 forms multiple passages 26 on the rear side, each of which provides a space for each magnetic strip 30 to be embedded. When the main body 20 is made of a material with elastic deformability, the length of each passage 26 is slightly shorter than the length of each magnetic strip 30. When the magnetic strips 30 are embedded in the main body 20, the magnetic strips 30 can pass through the passages 26 by bending and deforming the main body 20.

The distance between each magnetic strip 30 and its corresponding guide surface 42 along the thickness direction of the main body 20 is defined as a magnetic attraction distance D. Along the width direction of the main body 20, the magnetic attraction distance D decreases from each width side 23 toward the central part of the main body 20. Thus, the storage container 90 can be guided to move toward the central part of the main body 20 in the width direction and positioned.

The main body 20 forms a connecting surface 44 on one side in the thickness direction, which is concave toward the other side of the main body 20 to form an arc. The connecting surface 44 is located between each guide surface 42, and together, each guide surface 42 and the connecting surface 44 form an arcuate surface 40.

Figure 7:
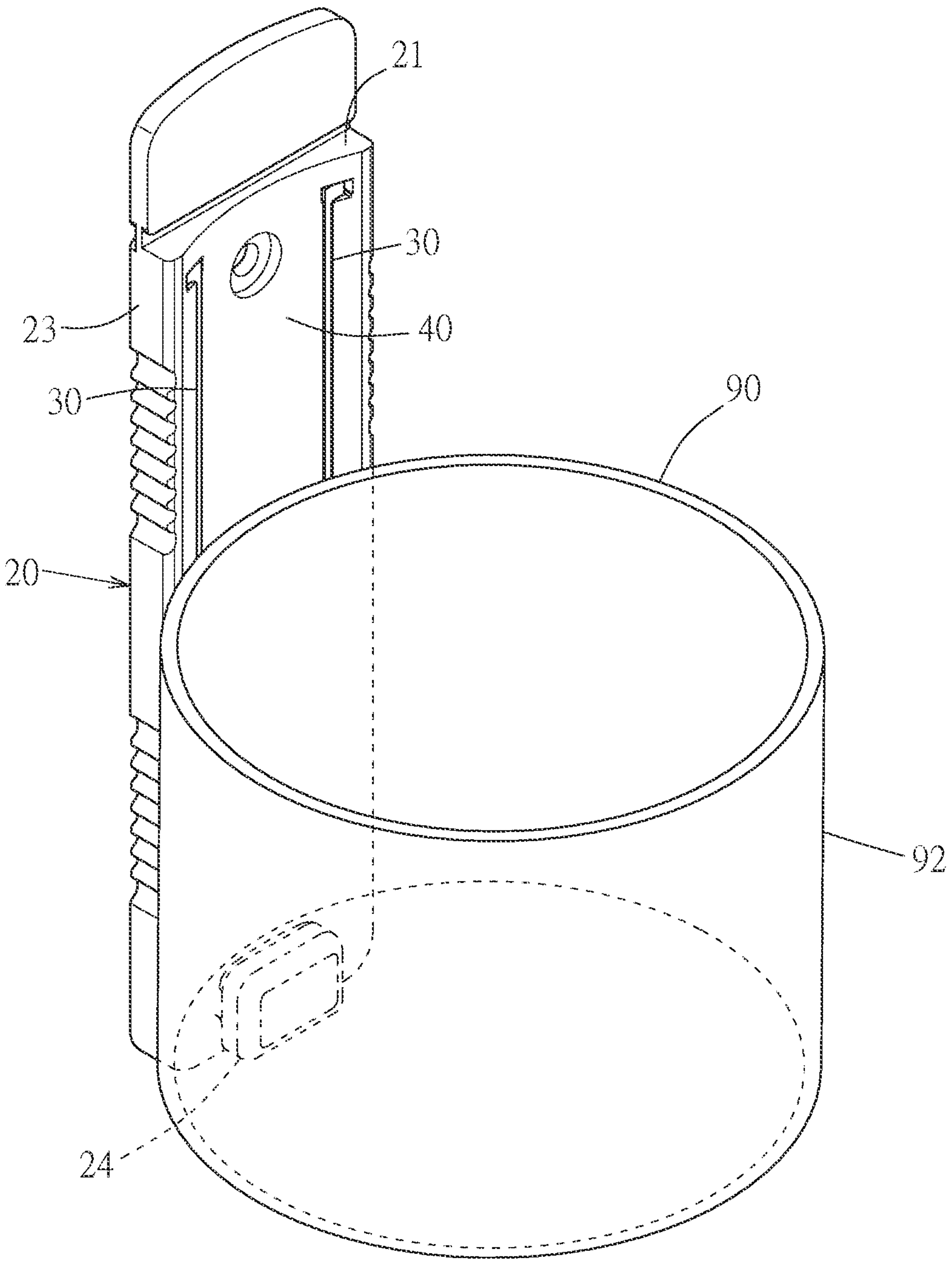
FIG. 7 is a three-dimensional view of the state of use of a preferred embodiment of the present invention.
Figure 8:
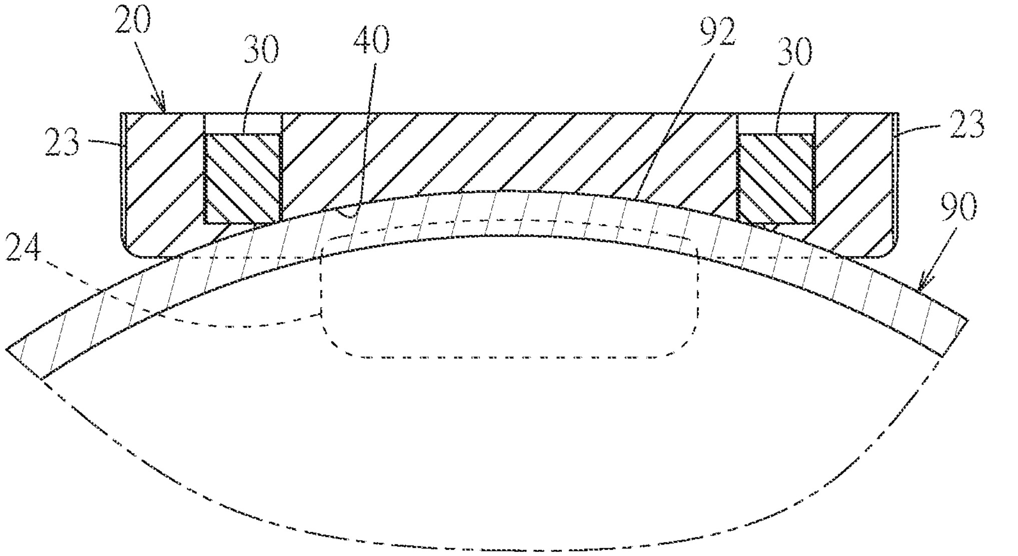
FIG. 8 is a partial cross-sectional view of the state of use of a preferred embodiment of the present invention.

FIGS. 7 and 8 illustrate a preferred embodiment in use for positioning a cylindrical storage container 90. The outer periphery of the storage container 90 features a circular outer surface 92 that matches the diameter of the arcuate surface 40. At this point, the outer surface 92 forms a face contact when attached to the arcuate surface 40, which significantly increases the stability of positioning the storage container 90 as compared to the prior art.

Figure 10:
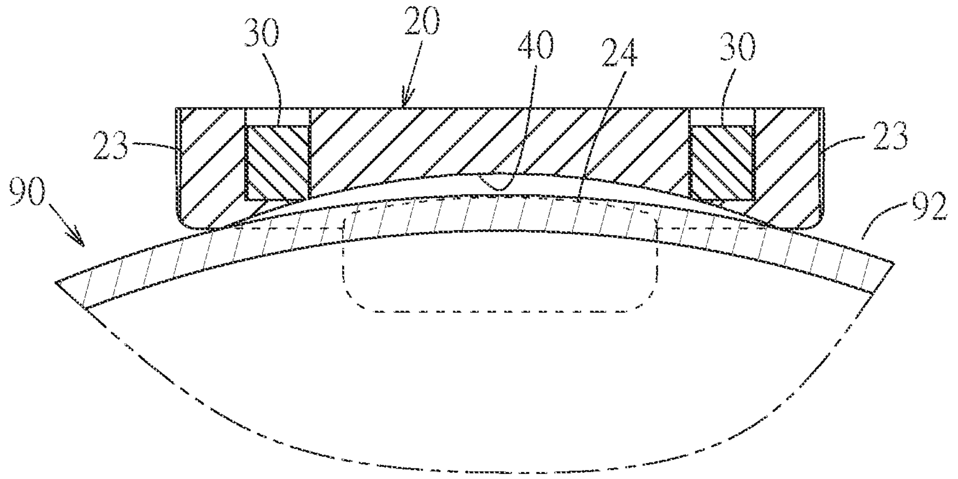
FIG. 10 is a cross-sectional view of another state of use of a preferred embodiment of the present invention.

FIG. 10 illustrates the state of use in which the outer diameter of the outer surface 92 is greater than the diameter of the arcuate surface 40. The formation of the arcuate surface 40 results in the outer surface 92 forming two line contacts with the main body 20. This further increases the stability of the positioning of the storage container 90 as compared to the prior art.

Furthermore, the formation of each guide surface 42 causes the magnetic attraction distance D to decrease from each width side 23 toward the central part of the main body 20. The magnetic effect of each magnetic strip 30 on the storage container 90 when it is near the central part of the main body 20 is greater than the magnetic effect when it is away from the central part of the main body 20. This difference in magnetic effects can guide the storage container 90 to move toward the central part of the main body 20 in the width direction, and to be positioned when the storage container 90 is inadvertently placed on either side of the width side 23. This is advantageous for the common magnetic adsorption positioning of each magnetic strip 30, thereby increasing the stability of the positioning of the storage container 90.

Figure 9:
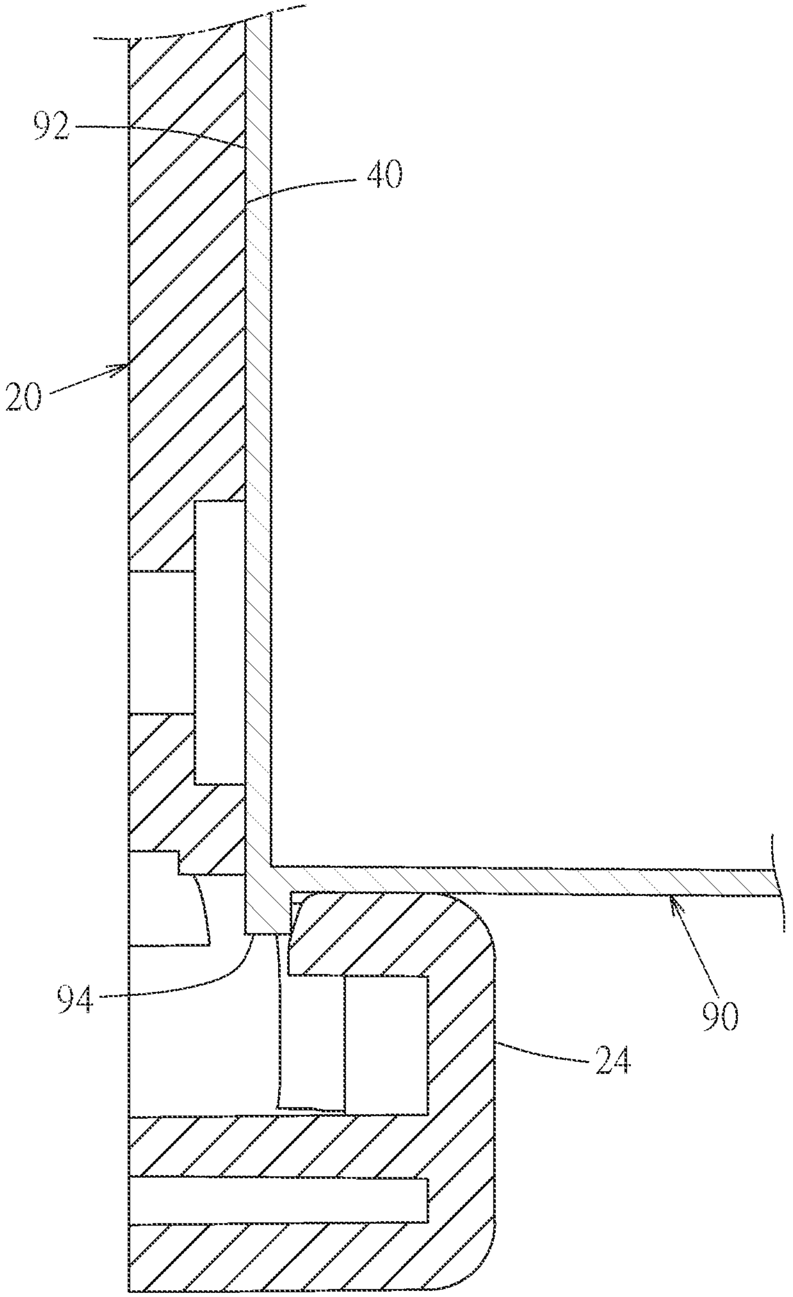
FIG. 9 is a partial cross-sectional view of the state of use of a preferred embodiment of the present invention.

A support 24 protrudes from the front side of the main body 20 and extends to the lower edge side 22. As shown in FIG. 9, the support 24 supports the storage container 90, thereby increasing the stability of the positioning of the storage container 90.

A gap 25 is formed between the support 24 along the positive projection of the main body 20 in the longitudinal direction and the arcuate surface 40. This selectively allows the storage container 90 to be pressed downward when the storage container 90 has a protruding annular convex ring 94 at the bottom, and when the storage container 90 is magnetically adsorbed by the magnetic strips 30, the convex ring 94 can be pressed downward to enter the gap 25, and the inner side of the support 24 corresponding to the annular convex ring 94 can form a lateral constraint on the convex ring 94. This prevents the storage container 90 from easily moving away from the arcuate surface 40 in the thickness direction of the main body 20, and the storage container 90 is less likely to be detached from the main body 20, thereby increasing the stability of the positioning of the storage container 90.

What is claimed is:

1. A magnetic positioning holder for magnetically positioning a cylindrical storage container, at least a part of which is made of a metal material that can be magnetically attracted, the magnetic positioning holder comprising:

a main body comprising an upper edge side and a lower edge side at opposite ends in a longitudinal direction of the main body, width sides formed on opposite sides in a width direction of the main body, and two guide surfaces formed on one side in a thickness direction of the main body, wherein each guide surface is adjacent to one of the width sides and is concave in the thickness direction to form an arcuate surface, an arcuate extension direction of each guide surface being directed toward the adjacent width side; and at least two magnetic strips, each being a longitudinally magnetized rectangular strip, fixedly embedded in the main body for magnetically attracting the storage container, wherein the magnetic strips are parallel to each other, and the longitudinal direction of each magnetic strip is directed toward the upper edge side and the lower edge side, each magnetic strip being adjacent to one of the width sides and corresponding to one of the guide surfaces along the thickness direction of the main body;

wherein a distance between each magnetic strip and its corresponding guide surface along the thickness direction of the main body defines a magnetic attraction distance, and along the width direction of the main body, the magnetic attraction distance of each magnetic strip decreases from each width side toward a central part of the main body, thereby urging a storage container to move toward and be positioned at the central part of the main body in the width direction.

2. The magnetic positioning holder according to claim 1, wherein the main body forms a connecting surface on one side in the thickness direction, and the connecting surface is concave toward the other side of the main body to form an arcuate surface of the main body; the connecting surface is located between each guide surface, and each guide surface and the connecting surface together form a combined arcuate surface.

3. The magnetic positioning holder according to claim 1, wherein a support protrudes from the front side of the main body and extends to the lower edge side used for supporting the storage container.

4. The magnetic positioning holder according to claim 2, wherein a support protrudes from the front side of the main body and extends to the lower edge side used for supporting the storage container; and a gap is formed between the support along a positive projection of the main body in the longitudinal direction and the arcuate surface of the main body, configured to allow a convex ring at the bottom of the storage container to enter the gap.

* * * * *